(12) United States Patent
Lius et al.

(10) Patent No.: US 11,830,964 B2
(45) Date of Patent: Nov. 28, 2023

(54) ELECTRONIC DEVICE

(71) Applicant: InnoLux Corporation, Miao-Li County (TW)

(72) Inventors: Chandra Lius, Miao-Li County (TW); Kuan-Feng Lee, Miao-Li County (TW)

(73) Assignee: InnoLux Corporation, Miao-Li County (TW)

(*) Notice: Subject to any disclaimer, the term of this patent is extended or adjusted under 35 U.S.C. 154(b) by 0 days.

(21) Appl. No.: 18/081,643

(22) Filed: Dec. 14, 2022

(65) Prior Publication Data
US 2023/0113407 A1 Apr. 13, 2023

Related U.S. Application Data

(62) Division of application No. 16/904,476, filed on Jun. 17, 2020, now Pat. No. 11,563,151.

(30) Foreign Application Priority Data

Jul. 18, 2019 (CN) .......................... 201910649674.7

(51) Int. Cl.
G06V 40/00 (2022.01)
G06V 40/13 (2022.01)
G06F 21/32 (2013.01)
H01L 33/48 (2010.01)

(52) U.S. Cl.
CPC ............ H01L 33/483 (2013.01); G06F 21/32 (2013.01); G06V 40/1318 (2022.01)

(58) Field of Classification Search
CPC ........ G06K 9/0004; G06K 9/00; G06F 21/32; H01L 33/483
See application file for complete search history.

(56) References Cited

U.S. PATENT DOCUMENTS

2018/0068166 A1* 3/2018 Zeng .................. G06V 40/1347
2018/0306640 A1* 10/2018 Pang ..................... G01J 1/0247
2019/0130155 A1* 5/2019 Park ...................... H10K 59/60
2020/0312273 A1* 10/2020 Hu ........................... G09G 5/10

* cited by examiner

Primary Examiner — Lixi C Simpson
(74) Attorney, Agent, or Firm — Winston Hsu

(57) ABSTRACT

An electronic device includes a substrate, a light emitting diode and an optical sensor. The light emitting diode is disposed on the substrate and emits a light. The optical sensor is disposed on the substrate and is configured to receive the light. The optical sensor receives the light to generate a first electrical signal for fingerprint authentication, and receives the light to generate a second electrical signal for luminance calibration of the light.

2 Claims, 7 Drawing Sheets

ELECTRONIC DEVICE

CROSS REFERENCE TO RELATED APPLICATIONS

This application is a division of U.S. application Ser. No. 16/904,476, filed on Jun. 17, 2020. The content of the application is incorporated herein by reference.

BACKGROUND OF THE DISCLOSURE

1. Field of the Disclosure

The present disclosure relates to an electronic device, more particularly to an electronic device including optical sensor.

2. Description of the Prior Art

In electronic devices, the optical sensor may be configured to detect light and generate signal in order to perform the functions of the electronic device. However, as users have higher demand about the electronic device, to improve the design of the optical sensor has become an important issue in electronic industry.

SUMMARY OF THE DISCLOSURE

In some embodiments, an electronic device is provided by the present disclosure. The electronic device includes a substrate, a light emitting diode and an optical sensor. The light emitting diode is disposed on the substrate and emits a light. The optical sensor is disposed on the substrate and is configured to receive the light, wherein the optical sensor receives the light to generate a first electrical signal for fingerprint authentication and receives the light to generate a second electrical signal for luminance calibration of the light.

These and other objectives of the present disclosure will no doubt become obvious to those of ordinary skill in the art after reading the following detailed description of the embodiment that is illustrated in the various figures and drawings.

DETAILED DESCRIPTION

The present disclosure may be understood by reference to the following detailed description, taken in conjunction with the drawings as described below. It is noted that, for purposes of illustrative clarity and being easily understood by the readers, various drawings of this disclosure show a portion of the electronic device, and certain elements in various drawings may not be drawn to scale. In addition, the number and dimension of each element shown in drawings are only illustrative and are not intended to limit the scope of the present disclosure.

Certain terms are used throughout the description and following claims to refer to particular elements. As one skilled in the art will understand, electronic equipment manufacturers may refer to an element by different names. This document does not intend to distinguish between elements that differ in name but not function.

In the following description and in the claims, the terms "include", "comprise" and "have" are used in an open-ended fashion, and thus should be interpreted to mean "include, but not limited to . . . ".

It will be understood that when an element or layer is referred to as being "disposed on" or "connected to" another element or layer, it can be directly on or directly connected to the other element or layer, or intervening elements or layers may be presented (indirectly). In contrast, when an element is referred to as being "directly on" or "directly connected to" another element or layer, there are no intervening elements or layers presented.

Although terms such as first, second, third, etc., maybe used to describe diverse constituent elements, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element maybe a second constituent element in a claim.

It should be noted that the technical features in different embodiments described in the following can be replaced, recombined, or mixed with one another to constitute another embodiment without departing from the spirit of the present disclosure.

Figure 1:
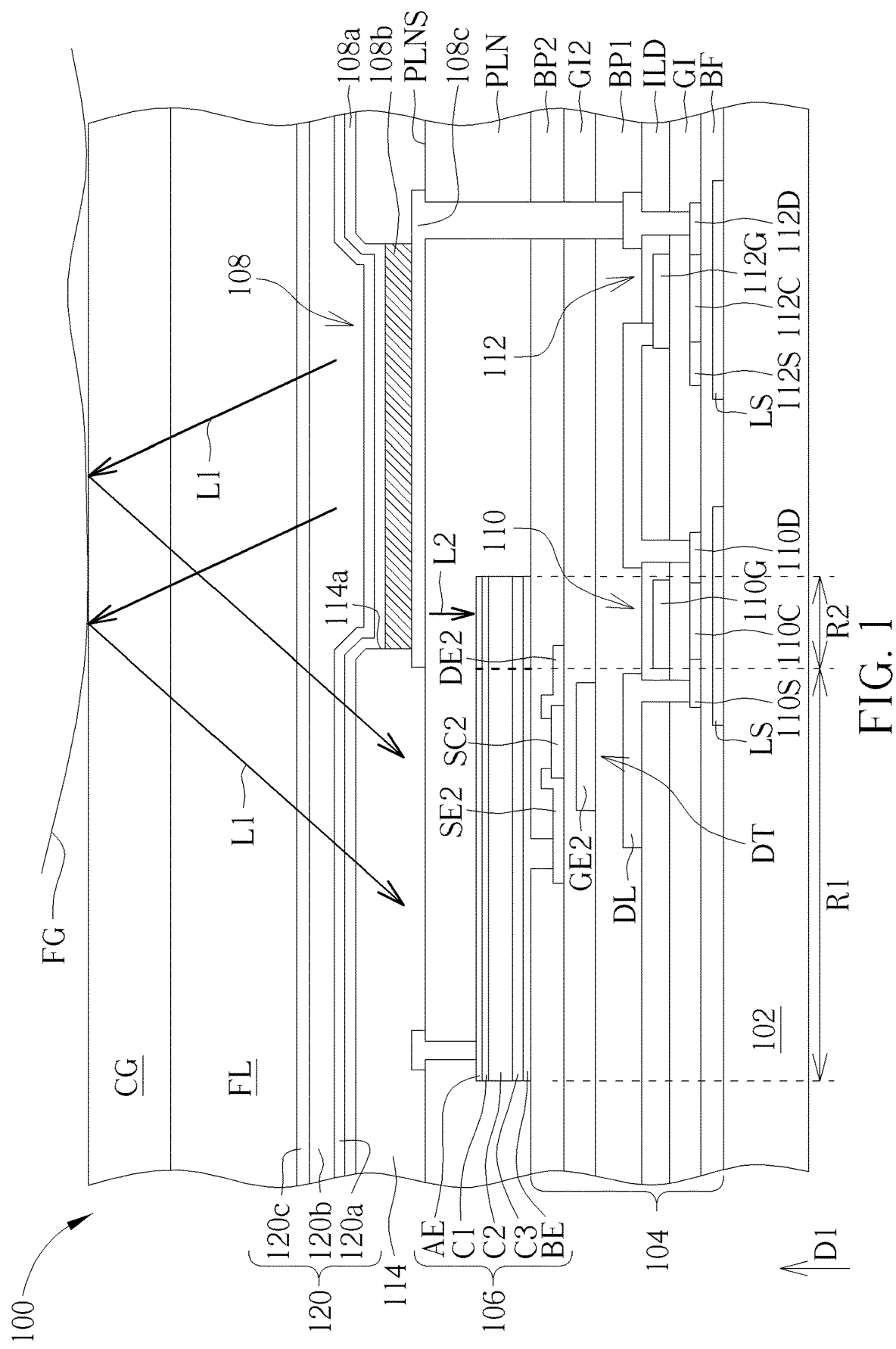
FIG. 1 schematically illustrates a cross-sectional view of an electronic device according to the first embodiment of the present disclosure.

Referring to FIG. 1, FIG. 1 schematically illustrates a cross-sectional view of an electronic device according to the first embodiment of the present disclosure. The electronic device 100 may include a display device, antenna, sensing device or tiled device, but not limited thereto. The electronic device may be a foldable electronic device or a flexible electronic device. The electronic device 100 may for example be served as a common display, a tiled display, a vehicle display, a display panel, a touch panel, a light source module, a television, a smart phone, a tablet, a laptop, a lighting equipment or an electronic device applied to the above-mentioned products, but not limited to the above-mentioned examples. As shown in FIG. 1, the electronic device 100 may include a substrate 102, a circuit layer 104, an optical sensor 106 and a light emitting diode 108. The substrate 102 may be a rigid substrate (such as glass substrate, quartz substrate, ceramic substrate or sapphire substrate, but not limited thereto), a flexible substrate (such as polyimide substrate, polycarbonate substrate, polyethylene terephthalate substrate or the like), other suitable substrate or the combinations of the above-mentioned substrates, but not limited thereto.

The light emitting diode 108 is disposed on the substrate 102, and may for example include a first electrode 108a, a second electrode 108c and a light emitting layer 108b, wherein the light emitting layer 108b is located between the first electrode 108a and the second electrode 108c. The first electrode 108a and the second electrode 108c may respectively be served as the cathode and anode of the light emitting diode 108, but not limited thereto. In a variant embodiment, the first electrode 108a and the second electrode 108c may respectively be served as the anode and cathode of the light emitting diode 108. In the present embodiment, the second electrode 108c may be closer to the substrate 102 than the first electrode 108a. The second electrode 108c is located at the lower side of the light emitting layer 108b, which may be called as a lower electrode, and the first electrode 108a is located at the upper side of the light emitting layer 108b, which may be called as an upper electrode. The first electrode 108a and the second electrode 108c may include metal oxide or metal material such as indium tin oxide, but not limited thereto. The light emitting diode 108 may for example include organic light emitting diode (OLED), quantum dot light-emitting diode (QLED or QDLED), mini light emitting diode (mini LED), micro light emitting diode (micro LED), other suitable light emitting elements or the combinations thereof. In an embodiment, the electronic device 100 may include liquid crystal (LC), quantum dot (QD), fluorescent material, phosphor material, other suitable material, or the combinations thereof, but not limited thereto. For example, the light emitting diode 108 shown in FIG. 1 may be the organic light emitting diode, but the present disclosure is not limited thereto. Besides, the light emitting diode 108 of the present disclosure may for example include blue light emitting diode, red light emitting diode, green light emitting diode or white light emitting diode, but not limited thereto. For example, the light emitting diode 108 maybe a blue light emitting diode. Although only one light emitting diode 108 is shown in FIG. 1, the present disclosure is not limited thereto. For example, the electronic device 100 may include two or more light emitting diodes.

A pixel defining layer 114 may be included on the substrate 102, wherein the pixel defining layer 114 may include at least one opening 114a. The light emitting diode 108 may be mainly located in the opening 114a, or in other words, the light emitting layer 108b of the light emitting diode 108 may be located in the opening 114a. In an embodiment, the opening 114a of the pixel defining layer 114 may define the light emitting region of light emitting area of the light emitting diode 108. According to the present disclosure, the light emitting diode 108 may emit a light L1 and a light L2. The light L1 may be emitted away from the substrate 102. In another aspect, the light L2 may be emitted toward the substrate 102.

The circuit layer 104 is disposed on the substrate 102, and may include various kinds of conductive lines, circuits and/or electronic elements such as switch element 110 and driving element 112. The switch element 110 and the driving element 112 may for example include a thin film transistor, but the present disclosure is not limited thereto. The switch element 110 may include a gate electrode 110G, a source electrode 110S, a drain electrode 110D, a semiconductor layer 110C and a first gate insulating layer GI. The first gate insulating layer GI is located between the gate electrode 110G and the semiconductor layer 110C. The gate electrode 110G of the switch element 110 maybe electrically connected to the scan line (not shown in FIG. 1), and the source electrode 110S may be electrically connected to the data line DL. The driving element 112 may include a gate electrode 112G, a source electrode 112S, a drain electrode 112D, a semiconductor layer 112C and the first gate insulating layer GI. The first gate insulating layer GI is located between the gate electrode 112G and the semiconductor layer 112C. In an embodiment, the gate electrode 112G of the driving element 112 may be electrically connected to the drain electrode 110D of the switch element 110, the drain electrode 112D of the driving element 112 may be electrically connected to the second electrode 108c of the light emitting diode 108, and the source electrode 112S of the driving element 112 may be electrically connected to the working voltage source (VDD) or the common voltage source, but not limited thereto. Besides, although the switch element 110 and the driving element 112 shown in FIG. 1 is a top gate thin film transistor, the present disclosure is not limited thereto. The switch element 110 and the driving element 112 may also include bottom gate thin film transistor or multi-gate thin film transistor (such as dual gate/double gate thin film transistor), and the switch element 110 and the driving element 112 may include the same type or different types of the thin film transistor. In an embodiment, the materials of the semiconductor layer 110C of the switch element 110 and the semiconductor layer 112C of the driving element 112 may respectively include amorphous semiconductor, poly-crystalline semiconductor, metal oxide (such as indium gallium zinc oxide (IGZO)), or the combinations thereof, but not limited thereto. The materials of the semiconductor layer 110C and the semiconductor layer 112C may be the same or different. For example, the material of one of the semiconductor layer 110C and the semiconductor layer 112C may include poly-crystalline silicon, and the material of another one of the semiconductor layer 110C and the semiconductor layer 112C may include indium gallium zinc oxide.

In the present embodiment, the optical sensor 106 may be located between the light emitting diode 108 and the substrate 102, but not limited thereto. Although the optical sensor 106 shown in FIG. 1 is located between the substrate 102 and the light emitting diode 108, the optical sensor 106 maybe disposed in other positions. For example, the optical sensor 106 may be disposed below the substrate 102 (that is, the substrate 102 is located between the optical sensor 106 and the light emitting diode 108) or above the light emitting diode 108 (that is, the light emitting diode 108 is located between the optical sensor 106 and the substrate 102). The optical sensor 106 may be various types of the optical sensor, and in the present embodiment, the PIN type diode is taken as an example of the optical sensor 106, but not limited thereto. As shown in FIG. 1, the optical sensor 106 may include a first electrode AE, a first semiconductor layer C1, a second semiconductor layer C2, a third semiconductor layer C3 and a second electrode BE. The first electrode AE and the second electrode BE may for example include metal materials, metal oxides or other suitable conductive materials, but not limited thereto. The first semiconductor layer C1 may include one of the N-type semiconductor layer and the P-type semiconductor layer, the third semiconductor layer C3 may include another one of the N-type semiconductor layer and the P-type semiconductor layer, and the second semiconductor layer C2 may include intrinsic semiconductor layer. For example, the first semiconductor layer C1 may be a N-type semiconductor layer, the second semiconductor layer C2 may be an intrinsic semiconductor layer, and the third semiconductor layer C3 may be a P-type semiconductor layer, but the present disclosure is not limited thereto.

A sensor switch element DT may be electrically connected to the optical sensor 106. The sensor switch element DT may be disposed adjacent to the optical sensor 106, for example, the switch element DT may be disposed below the optical sensor 106 and may for example be configured to control the transmission of the sensing signal. In the present embodiment, the sensor switch element DT may for example be a thin film transistor, and may include a gate electrode GE2, a source electrode SE2, a drain electrode DE2, a semiconductor layer SC2 and a second gate insulating layer GI2. The second gate insulating layer GI2 is located between the gate electrode GE2 and the semiconductor layer SC2, but not limited thereto. In the present embodiment, the source electrode SE2 of the sensor switch element DT may for example be electrically connected to the second electrode BE of the optical sensor 106, but not limited thereto.

According to the present embodiment, the optical sensor 106 may be partially overlapped with the light emitting diode 108 in a thickness direction D1 of the substrate 102. The term "partially overlapped" means that the entire light emitting diode 108 or a portion of the light emitting diode 108 may be overlapped with the optical sensor 106 in the thickness direction D1. As shown in FIG. 1, the optical sensor 106 includes a first region R1 and a second region R2, the first region R1 is not overlapped with the light emitting diode 108, and the second region R2 is overlapped with the light emitting diode 108. It should be noted that the term "overlapped with the light emitting diode 108" means that the optical sensor 106 and the second electrode 108c of the light emitting diode 108 are at least partially overlapped, but the present disclosure is not limited thereto. In the present embodiment, the area of the first region R1 of the optical sensor 106 may be greater than the area of the second region R2 of the optical sensor 106. In some embodiments, a ratio of the area of the second region R2 to the area of the light emitting diode 108 may range from 0.1 to 1 (that is, 0.1≤ratio≤1). It should be noted that the term "area of the light emitting diode" may be regarded as the area of the light emitting layer 108b in a top view, but the present disclosure is not limited thereto. For example, the area of the light emitting diode 108 may also be defined by the area of the lower surface of the opening 114a of the pixel defining layer 114.

The first region R1 of the optical sensor 106 may for example receive the light L1 emitted from the light emitting diode 108, for example, when the object FG (such as fingers) touches the electronic device 100, the light L1 may be reflected by the object FG such that the first region R1 may receive the light L1, thereby generating a first electrical signal. The first electrical signal may for example be for fingerprint authentication, but not limited thereto. The optical sensor 106 may for example be configured to receive ambient light to generate the first electrical signal in order to obtain the information of the ambient light. The second region R2 of the optical sensor 106 may for example be configured to receive the light L2 emitted from the light emitting diode 108 to generate a second electrical signal. The second electrical signal may for example be for luminance calibration of the light emitting diode 108, but not limited thereto. In an embodiment, the first electrical signal and the second electrical signal may respectively be for fingerprint authentication, obtaining the information of ambient light, luminance calibration of the light emitting diode 108 and/or other suitable functions, but not limited thereto.

In an embodiment, a light shielding layer LS may be disposed on the substrate 102, and is located between the circuit layer 104 and the substrate 102 in the thickness direction D1, for example, the light shielding layer LS may be located between the switch element 110 and the substrate 102 and/or between the driving element 112 and the substrate 102, but not limited thereto. The light shielding layer LS may for example be configured to decrease the incoming light from the substrate 102 in order to decrease the effect of the ambient light on the switch element 110 and the driving element 112, but not limited thereto.

In an embodiment, a planarization layer PLN may be disposed on the optical sensor 106, and may provide a flat surface PLNS in order to dispose the second electrode 108c and the light emitting layer 108b which are subsequently formed, but not limited thereto. A functional layer FL and a protection layer CG may be selectively included in the electronic device 100 of the present disclosure. The functional layer FL may be served to provide the optical function or the touch function required by the electronic device 100, and the protection layer CG may for example be configured to protect the functional layer FL and other layers and/or elements below the functional layer FL, but not limited thereto. The electronic device 100 may further include an insulating layer 120 disposed on the pixel defining layer 114 and the light emitting diode 108. In some embodiments, the insulating layer 120 maybe a single layer structure or a multi-layer structure. For example, the insulating layer 120 may include a first insulating layer 120a, a second insulating layer 120b and a third insulating layer 120c, the first insulating layer 120a and the third insulating layer 120c may for example include inorganic insulating materials, and the second insulating layer 120b may for example include organic insulating materials, but not limited thereto. In an embodiment, the insulating layer 120 may also provide planarization effect. Except for the above-mentioned elements or layers, the electronic device 100 of the present embodiment may for example include a buffer layer BF disposed on the light shielding layer LS, an intermediate dielectric layer ILD disposed on the first gate insulating layer GI, an insulating layer BP1 disposed on the intermediate dielectric layer ILD and an insulating layer BP2 disposed on the second gate insulating layer GI2, but not limited thereto.

Figure 2:
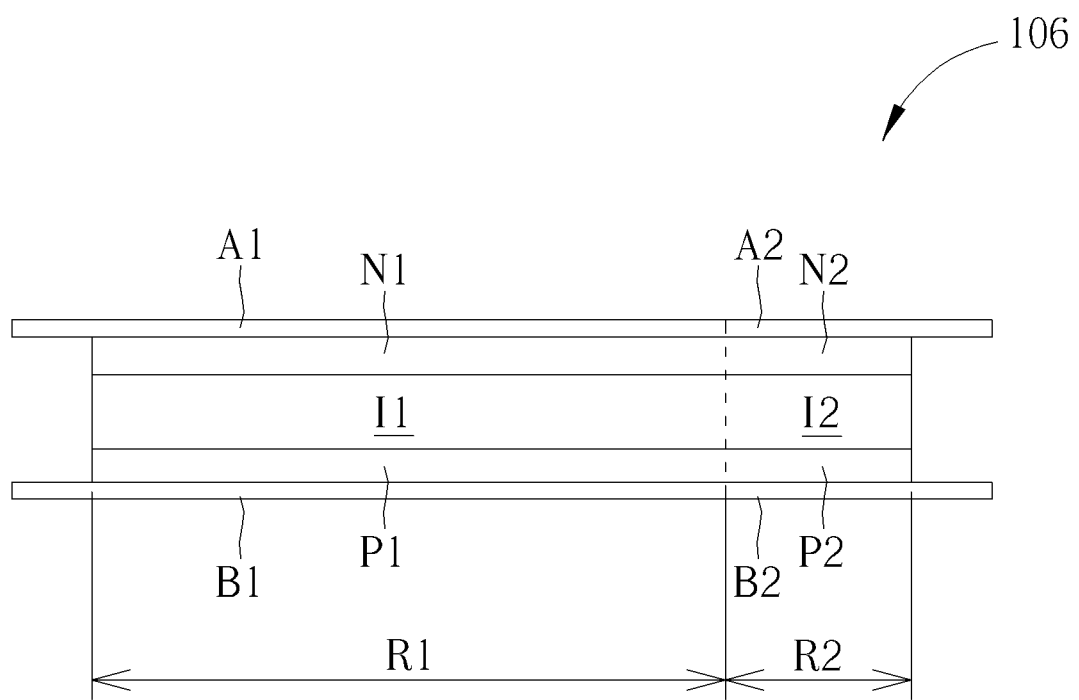
FIG. 2 schematically illustrates a partial enlargement cross-sectional view of an optical sensor according to a variant embodiment of the first embodiment of the present disclosure.

Referring to FIG. 2, FIG. 2 schematically illustrates a partial enlargement cross-sectional view of an optical sensor according to a variant embodiment of the first embodiment of the present disclosure. In the present variant embodiment, the materials of the first region R1 and the second region R2 of the optical sensor 106 may have different combinations according to the demands. The optical sensor 106 may include a first electrode A1, a first type semiconductor layer N1, an intrinsic semiconductor layer I1, a second type semiconductor layer P1 and a second electrode B1 which are located in the first region R1, and a first electrode A2, a first type semiconductor layer N2, an intrinsic semiconductor layer I2, a second type semiconductor layer P2 and a second electrode B2 which are located in the second region R2. In an embodiment, the first type semiconductor layer N1 and the first type semiconductor layer N2 may be one of the N-type semiconductor layer and the P-type semiconductor layer, and the second type semiconductor layer P1 and the second type semiconductor layer P2 maybe another one of the N-type semiconductor layer and the P-type semiconductor layer. According to a variant embodiment, the first electrode A1 and the first electrode A2 may include the same material such as conductive material, and the second electrode B1 and the second electrode B2 may include the same material such as conductive material. That is, the semiconductor layers in the first region R1 and the second region R2 (including the first type semiconductor layer, the intrinsic semiconductor layer and the second type semiconductor layer) may share the first electrode and the second electrode. Besides, in an embodiment, the materials of the first type semiconductor layer N1, the intrinsic semiconductor layer I1 and the second type semiconductor layer P1 in the first region R1 may respectively be the same as the materials of the first type semiconductor layer N2, the intrinsic semiconductor layer I2 and the second type semiconductor layer P2 in the second region R2, but the doping amount of the semiconductor layers in these two regions may be different. For example, the semiconductor layers in the first region R1 and the second region R2 (including the first type semiconductor layer, the intrinsic semiconductor layer and the second type semiconductor layer) may include silicon, and the doping amount of the first type semiconductor layer N2, the second type semiconductor layer P2 and/or the intrinsic semiconductor layer I2 in the second region R2 may be greater than the doping amount of the first type semiconductor layer N1, the second type semiconductor layer P1 and/or the intrinsic semiconductor layer I1 in the first region R1, but the present disclosure is not limited thereto. According to another variant embodiment, the materials of the first type semiconductor layer N1, the intrinsic layer I1 and the second type semiconductor layer P1 in the first region R1 may respectively be different from the materials of the first type semiconductor layer N2, the intrinsic layer I2 and the second type semiconductor layer P2 in the second region R2. For example, the materials of the first type semiconductor layer N1, the intrinsic layer I1 and the second type semiconductor layer P1 in the first region R1 may for example include silicon, and the materials of the first type semiconductor layer N2, the intrinsic layer I2 and the second type semiconductor layer P2 in the second region R2 may for example include germanium, but not limited thereto. In another embodiment, the material of the second type semiconductor layer P1 in the first region R1 may be the same as the material of the second type semiconductor layer P2 in the second region R2, for example, including silicon. Besides, the materials of the first type semiconductor layer N1 and the intrinsic layer I1 in the first region R1 may respectively be different from the materials of the first type semiconductor layer N2 and the intrinsic layer I2 in the second region R2. For example, the second type semiconductor layer P1 in the first region R1 and the second type semiconductor layer P2 in the second region R2 may for example include silicon, the first type semiconductor layer N1 and the intrinsic semiconductor layer I1 in the first region R1 may for example include silicon, and the first type semiconductor layer N2 and the intrinsic semiconductor layer I2 in the second region R2 may for example include germanium, but not limited to the above-mentioned materials. According to yet another embodiment, in the optical sensor 106, the material of the first electrode A1 in the first region R1 may be different from the material of the first electrode A2 in the second region R2, and the material of the second electrode B1 in the first region R1 may be different from the material of the second electrode B2 in the second region R2. Besides, the materials of the first type semiconductor layer N1, the intrinsic layer I1 and the second type semiconductor layer P1 in the first region R1 may be different from the materials of the first type semiconductor layer N2, the intrinsic layer I2 and the second type semiconductor layer P2 in the second region R2. For example, the first type semiconductor layer N1, the intrinsic layer I1 and the second type semiconductor layer P1 in the first region R1 may include silicon, and the first type semiconductor layer N2, the intrinsic layer I2 and the second type semiconductor layer P2 in the second region R2 may include germanium, but not limited thereto. The materials of each of the layers such as the first electrode, the second electrode, the first type semiconductor layer, the intrinsic semiconductor layer and the second type semiconductor layer in the first region R1 and the second region R2 mentioned above maybe designed to be the same or different according to the demands.

Figure 3:
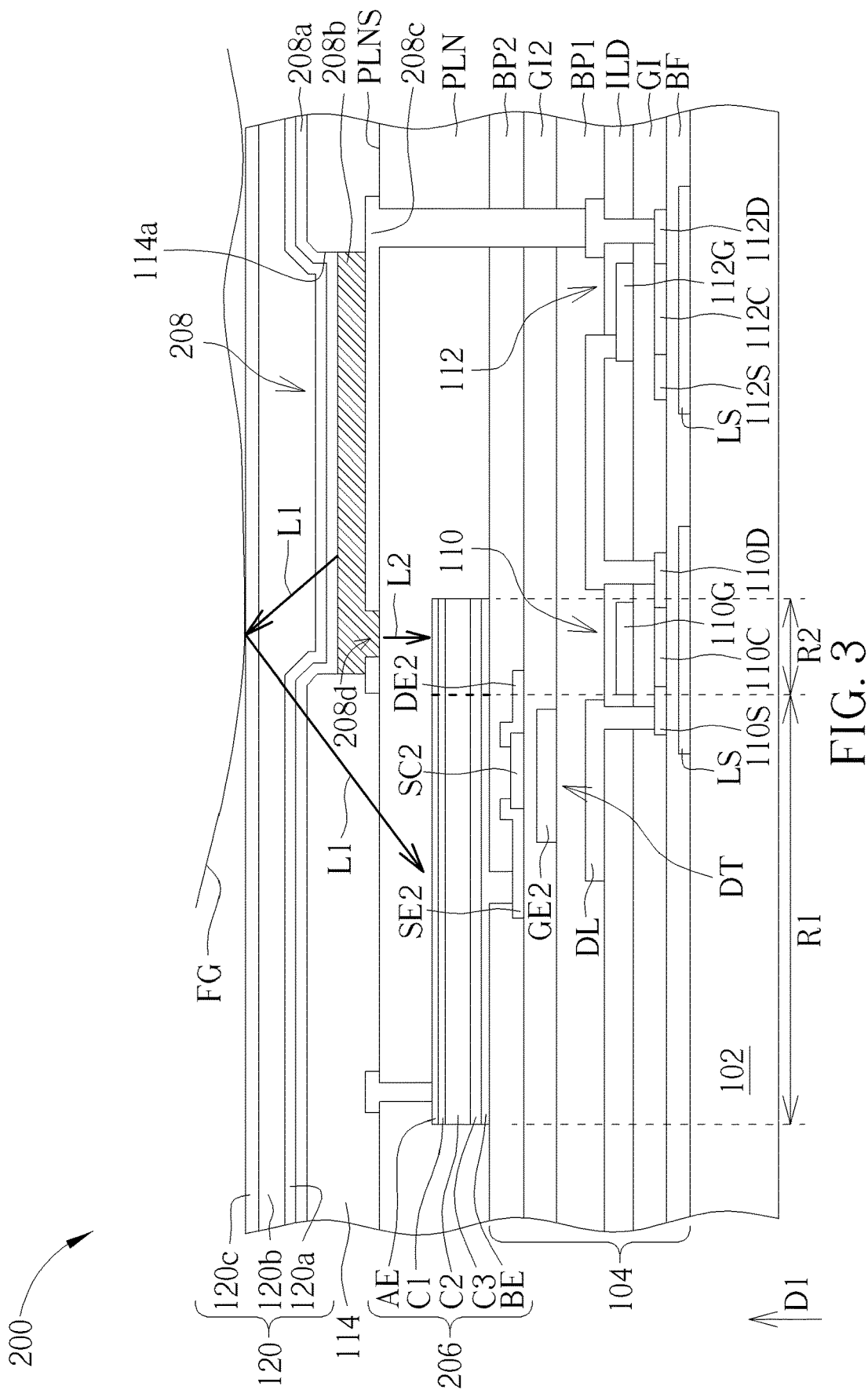
FIG. 3 schematically illustrates a cross-sectional view of an electronic device according to the second embodiment of the present disclosure.

Referring to FIG. 3, FIG. 3 schematically illustrates a cross-sectional view of an electronic device according to the second embodiment of the present disclosure. In order to simplify the figure, the functional layer and the protection layer which are selectively disposed are omitted in FIG. 3. The main difference between the electronic device 200 of the present embodiment and the electronic device of the first embodiment shown in FIG. 1 is that the second electrode 208c of the light emitting diode 208 of the electronic device 200 in the present embodiment may include an opening 208d. As shown in FIG. 3, the light emitting diode 208 may include a first electrode 208a, a light emitting layer 208b and a second electrode 208c, wherein an opening 208d may be included in the second electrode 208c, and the light emitting layer 208b maybe filled into the opening 208d. The first electrode 208a and the second electrode 208c of the light emitting diode 208 may for example include metal oxide or metal material. For example, the first electrode 208a may include metal oxide material (such as indium tin oxide (ITO)), and the second electrode 208c may include conductive metal material, but not limited thereto. Similarly, although only one light emitting diode 208 is shown in FIG. 3, the present disclosure is not limited thereto. The electronic device 200 may for example include two or more light emitting diodes. Similar to the first embodiment, the optical sensor 206 of the present embodiment has a first region R1 not overlapping the light emitting diode 208 and a second region R2 overlapping the light emitting diode 208. The first region R1 of the optical sensor 206 may for example receive the light L1 to generate the first electrical signal for fingerprint authentication. The light L1 may be emitted from the light emitting diode 208, and may be reflected by the object FG to the optical sensor 206; the second region R2 of the optical sensor 206 may for example receive the light L2 emitted from the light emitting diode 208, and may for example generate the second electrical signal for luminance calibration of the light emitting diode 208, but the present disclosure is not limited to the above-mentioned contents. According to the present embodiment, the light L2 may for example be emitted from the light emitting layer 208b and reach the second region R2 of the optical sensor 206 through the opening 208d, but not limited thereto. Other elements or layers of the electronic device 200 of the present embodiment may be the same as or similar to the elements or layers in the first embodiment, and will not be redundantly described here.

Figure 4:
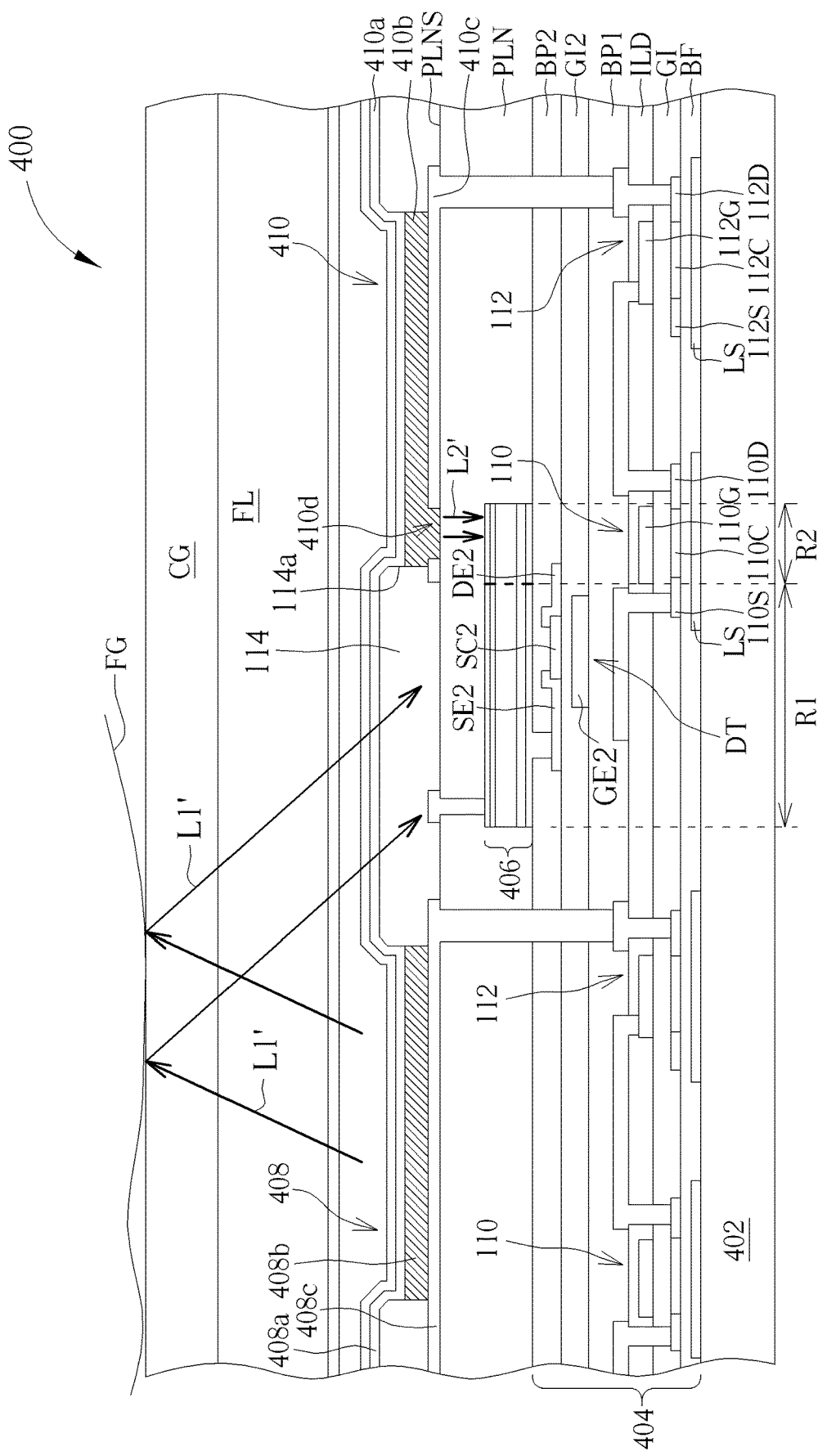
FIG. 4 schematically illustrates a cross-sectional view of an electronic device according to the third embodiment of the present disclosure.

Referring to FIG. 4, FIG. 4 schematically illustrates a cross-sectional view of an electronic device according to the third embodiment of the present disclosure. The electronic device 400 may include a substrate 402, a circuit layer 404, an optical sensor 406, a first light emitting diode 408 and a second light emitting diode 410. The main difference between the present embodiment and the second embodiment is that the electronic device 400 of the present embodiment has the first light emitting diode 408 and the second light emitting diode 410, and the optical sensor 406 may be partially overlapped with the second light emitting diode 410. The second light emitting diode 410 may include a first electrode 410a, a light emitting layer 410b and a second electrode 410c. The material of the substrate 402, the structure of the circuit layer 404, the material and disposed position of the optical sensor 406, and the materials of the first light emitting diode 408 and the second light emitting diode 410 may refer to the first embodiment, which will not be redundantly described here. It should be noted that although only two light emitting diodes are shown in FIG. 4, the present disclosure is not limited thereto. The electronic device 400 may include more light emitting diodes. In the present embodiment, as shown in FIG. 4, the first light emitting diode 408 may not be overlapped with the optical sensor 406, and the second light emitting diode 410 may be partially overlapped with the optical sensor 406, but not limited thereto. Similarly, the term "partially overlapped" means that the entire second light emitting diode 410 or a portion of the second light emitting diode 410 may be overlapped with the optical sensor 406 in the thickness direction D1. The optical sensor 406 may include a first region R1 and a second region R2, wherein the first region R1 is not overlapped with the second light emitting diode 410, and the second region R2 is overlapped with the second light emitting diode 410. It should be noted that the second region R2 of the present embodiment may include the region in which the optical sensor 206 and the second electrode 208c of the light emitting diode 208 are at least partially overlapped, and the region in which the optical sensor 206 and the opening 208d are at least partially overlapped, but the present disclosure is not limited thereto. According to the present embodiment, the first light emitting diode 408 may emit the first light L1', and the first region R1 of the optical sensor 406 may for example receive the first light L1' emitted from the first light emitting diode 408, but not limited thereto. For example, when the object FG touches the electronic device 400, the first light L1' may be reflected by the object FG such that the first region may receive the first light L1' and generate the first electrical signal. The first electrical signal may for example be for fingerprint authentication, but not limited thereto. The optical sensor 406 may for example be configured to detect the ambient light to generate the first electrical signal for obtaining the information (such as luminance) of the ambient light. The second light emitting diode 410 may emit the second light L2', and the second region R2 of the optical sensor 406 may for example receive the second light L2' emitted from the second light emitting diode 410, but not limited thereto. For example, the second region R2 of the optical sensor 406 may receive the second light L2' emitted from the second light emitting diode 410 and generate the second electrical signal for luminance calibration of the second light emitting diode 410, but not limited thereto. According to the present embodiment, the wavelength of the first light L1' may be greater than the wavelength of the second light L2'. The wavelength of the first light L1' may range from 495 nanometers (nm) to 570 nm (495 nm≤L1'≤570 nm), and the wavelength of the second light L2' may range from 450 nm to 495 nm (450 nm≤L2'≤495 nm). For example, the first light L1' may include green light, and the second light L2' may include blue light, but not limited thereto. It should be noted that "the wavelength of the first light L1' may be greater than the wavelength of the second light L2'" mentioned above means that the peak value of the crest of the spectrogram of the first light L1' is greater than the peak value of the crest of the spectrogram of the second light L2'. The spectrogram of the first light L1' and the spectrogram of the second light L2' may be obtained by measuring the first light L1' emitted from the first light emitting diode 408 and the second light L2' emitted from the second light emitting diode 410 at outside (or display surface) of the device, but not limited thereto. Although the second light L2' shown in FIG. 4 is emitted toward the substrate 402, the emitting direction or measuring direction of the second light L2' is not limited thereto. According to the present embodiment, when operating the electronic device 400, the first light L1' and the second light L2' may be emitted simultaneously or not, that is, when the first light emitting diode 408 emits the first light the second light emitting diode 410 may emit the second light L2' simultaneously, or, the time when the first light emitting diode 408 emits the first light L1' and the time when the second light emitting diode 410 emits the second light L2' may be staggered. Besides, in the present embodiment, as shown in FIG. 4, the second electrode 410c of the second light emitting diode 410 includes an opening 410d, therefore, the second light L2' may for example be emitted from the second light emitting diode 410, and reach the second region R2 of the optical sensor 406 through the opening 410d, but not limited thereto. In other variant embodiments, the second electrode 410c of the second light emitting diode 410 may not include the opening 410d, and the second light L2' may directly penetrate through the second electrode 410c and reach the second region R2 of the optical sensor 406. For example, when the second electrode 410c includes opaque material (such as metal material), the opening 410d may be formed in the second electrode 410c in order to allow the light L2' to penetrate through. When the second electrode 410c includes transparent material (such as transparent conductive material), the opening 410d may not be formed in the second electrode 410c. In an embodiment, the first electrical signal and the second electrical signal may respectively be for fingerprint authentication, obtaining the information of the ambient light, luminance calibration of the light emitting diode 108, and/or other suitable functions, but not limited thereto. For example, the optical sensor 406 may use the first light L1' to generate the first electrical signal for luminance calibration of the first light emitting diode 408 and/or the second light emitting diode 410.

Figure 5:
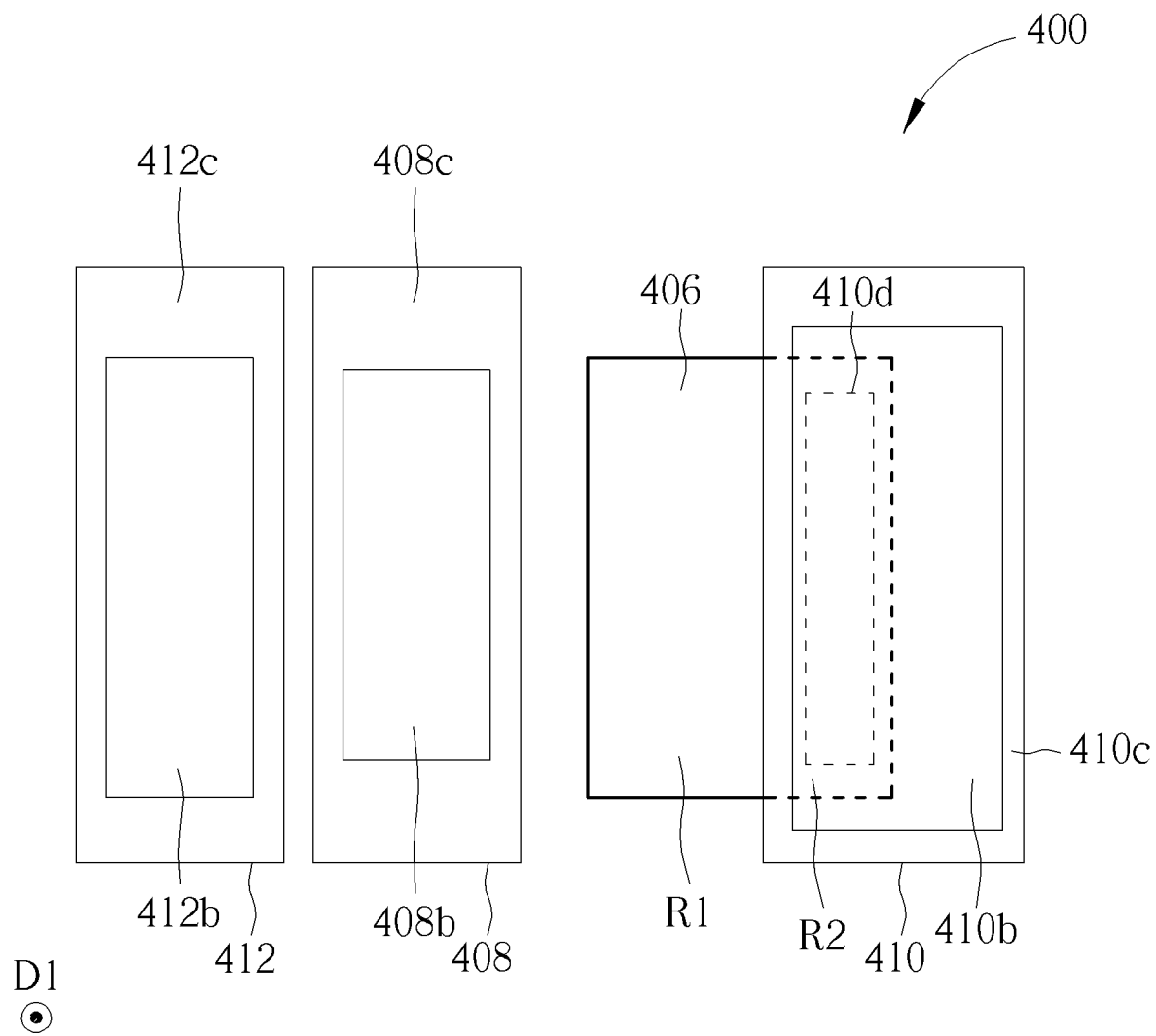
FIG. 5 schematically illustrates a top view of a light emitting diode and an optical sensor according to a variant embodiment of the third embodiment of the present disclosure.

Referring to FIG. 5, FIG. 5 schematically illustrates a top view of a light emitting diode and an optical sensor according to a variant embodiment of the third embodiment of the present disclosure. The electronic device 400 may include a first light emitting diode 408, a second light emitting diode 410, a third light emitting diode 412 and an optical sensor 406. In order to simplify the figure, FIG. 5 only shows the light emitting layer 408b and the second electrode 408c of the first light emitting diode 408, the light emitting layer 410b and the second electrode 410c of the second light emitting diode 410, and the light emitting layer 412b and the second electrode 412c of the third light emitting diode 412. In an embodiment, the adjacent first light emitting diode 408, the second light emitting diode 410 and the third light emitting diode 412 may form a pixel, and the second light emitting diode 410 may be partially overlapped with the optical sensor 406 in the thickness direction D1. In another embodiment, the optical sensor 406 may be partially overlapped with the first light emitting diode 408 in the thickness direction D1, and the first light emitting diode 408 is disposed between the second light emitting diode 410 and the third light emitting diode 412. The first light emitting diode 408 may emit a light with a first color, the second light emitting diode 410 may emit a light with a second color, and the third light emitting diode 412 may emit a light with a third color, wherein the first color, the second color and the third color may be different from each other, or at least two of the first color, the second color and the third color are the same, but not limited thereto. For example, the first color, the second color and the third color may respectively be one of red color, green color and blue color, but the present disclosure is not limited thereto. For example, because the decay of the blue light emitting diode may be more obvious than the red light emitting diode and the green light emitting diode, the second light emitting diode 410 which is overlapped with the optical sensor may be deigned to be a blue light emitting diode in order to make the optical sensor 406 capable of detecting the light emitted from the blue light emitting diode and performing luminance calibration, but not limited thereto. Besides, according to the present embodiment, the second electrode 410c of the second light emitting diode 410 may include an opening 410d and the light may for example reach the optical sensor 406 through the opening 410d, but not limited thereto. In other variant embodiments, the second electrode 410c may not include the opening 410d. In other embodiments, a pixel may include four light emitting diodes or more than four light emitting diodes such as the red light emitting diode, the blue light emitting diode, the green light emitting diode and the white light emitting diode, but not limited thereto.

Figure 6:
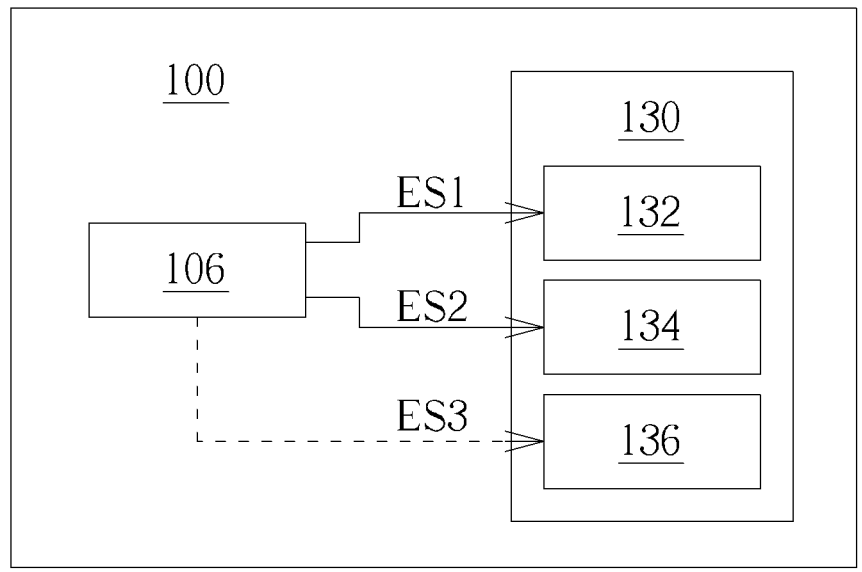
FIG. 6 schematically illustrates a functional block diagram of an exemplary operation method of the optical sensor according to the first embodiment of the present disclosure.
Figure 7:
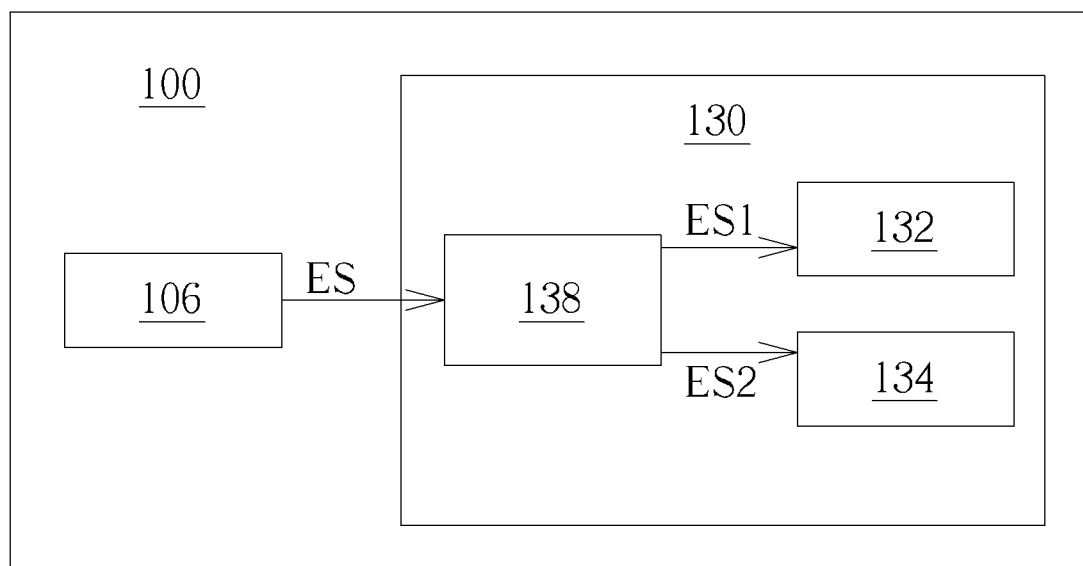
FIG. 7 schematically illustrates a functional block diagram of another exemplary operation method of the optical sensor according to the first embodiment of the present disclosure.

Referring to FIG. 6 to FIG. 7 and also referring to FIG. 1, FIG. 6 schematically illustrates a functional block diagram of an exemplary operation method of the optical sensor according to the first embodiment of the present disclosure, and FIG. 7 schematically illustrates a functional block diagram of another exemplary operation method of the optical sensor according to the first embodiment of the present disclosure. As shown in FIG. 6, the electronic device 100 may further include a processor 130, wherein the processor 130 may include a fingerprint authentication unit 132 and a luminance calibration unit 134. The optical sensor 106 may receive the light signal in different timing sequence, and transfer the light signal into the first electrical signal ES1 and the second electrical signal ES2. For example, the optical sensor 106 may transfer the light L1 received in the first region R1 into the first electrical signal ES1 in a time period, and transmit the first electrical signal ES1 to the fingerprint authentication unit 132, and the information of the fingerprint may be obtained through calculation or identification performed by the fingerprint authentication unit 132. In another aspect, the optical sensor 106 may transfer the light L2 received in the second region R2 into the second electrical signal ES2 in another time period, and transmit the second electrical signal ES2 to the luminance calibration unit 134, and the light emitting effect of the light emitting diode 108 may be judged by the luminance calibration unit 134. If the calibration process is needed, a calibration signal may be sent by the luminance calibration unit 134. That is, as mentioned above, the optical sensor 106 may respectively process the light received in the first region R1 and the second region R2 at different time periods. As mentioned above, the first electrical signal ES1 may for example be for fingerprint authentication, and the second electrical signal ES2 may for example be for luminance calibration of the light emitting diode, but not limited thereto. Besides, the optical sensor 106 may optionally include an ambient light identification unit 136. When the optical sensor 106 receives the ambient light, the received ambient light may be transferred into a third electrical signal ES3, the third electrical signal ES3 may be transmitted to the ambient light identification unit 136, and the information of the ambient light may be obtained through calculation or identification performed by the ambient light identification unit 136, but not limited thereto. According to the present embodiment, the ambient light may for example be received in the first region R1 of the optical sensor 106, but not limited thereto. Referring to FIG. 7, in another exemplary operation method, the processor 130 of the electronic device 100 may further include an electrical signal distributor 138. According to the present embodiment, the optical sensor 106 may only receive a light. In an embodiment, the light may include the light L1 and the light L2 emitted simultaneously. The light may be transferred into an electrical signal ES, the electrical signal ES may be divided into the first electrical signal ES1 and the second electrical signal ES2 by the electrical signal distributor 138 in the processor 130, and the first electrical signal ES1 and the second electrical signal ES2 may be respectively sent to the fingerprint authentication unit 132 and the luminance calibration unit 134 at the same time. The application of the first electrical signal ES1 and the second electrical signal ES2 may refer to the above-mentioned contents, and will not be redundantly described. In an variant embodiment, the processor 130 shown in FIG. 7 may also include the ambient light identification unit, the electrical signal distributor 138 may transfer the electrical signal ES into the second electrical signal ES2 and the third electrical signal (not shown in FIG.), and the second electrical signal ES2 and the third electrical signal may be respectively transmitted to the luminance calibration unit 134 and the ambient light identification unit.

Figure 8:
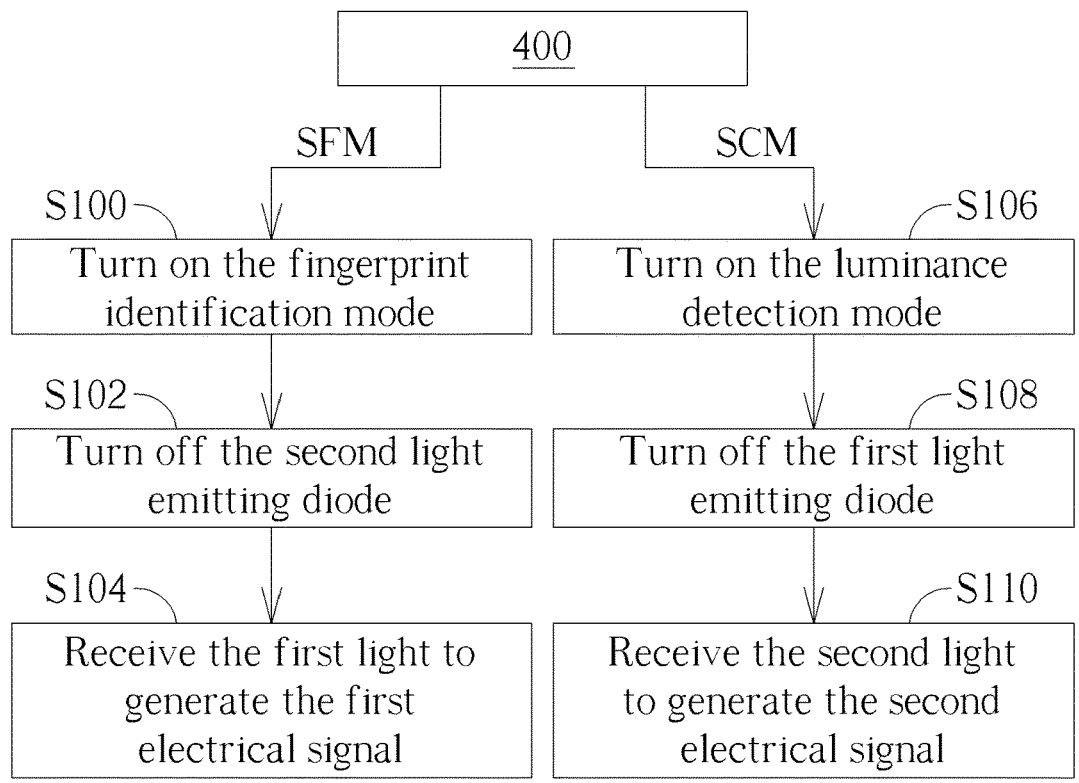
FIG. 8 schematically illustrates a flow chart of an operation method of the electronic device according to the third embodiment of the present disclosure.

Referring to FIG. 8, and also referring to FIG. 4, FIG. 8 schematically illustrates a flaw chart of an operation method of the electronic device according to the third embodiment of the present disclosure. The electronic device 400 may for example be a display device, but not limited thereto. As shown in FIG. 8, the display device may for example selectively enter the fingerprint authentication mode SFM or the luminance detection mode SCM. For example, when the user wants to enter the fingerprint authentication mode SFM, the step 5100 may be performed to turn on the fingerprint authentication mode SFM. Then, the step 5102 may be performed on the display device to turn off the second light emitting diode 410, wherein the second light emitting diode 410 may be partially overlapped with the optical sensor 406, for example, the sub-pixel corresponding to the second light emitting diode 410 may be turned off. For example, when the display device enters the fingerprint authentication mode SFM, the blue sub-pixel may be turned off, but not limited thereto. Because the authentication of the fingerprint may be performed by the first electrical signal generated after the first region R1 of the optical sensor 406 receives the first light L1', in order to decrease the effect of the second light L2' emitted from the second light emitting diode 410 on the result of the detection, the sub-pixel corresponding to the second light emitting diode 410 may be turned off. After the step 5102 is finished, the step 5104 may be performed to receive the first light, thereby generating the first electrical signal. The optical sensor 406 may for example receive the first light L1' emitted from the first light emitting diode 408 and reflected by the object FG, and the first light L1' may be transferred into the first electrical signal in order to identify the information of the fingerprint, but not limited thereto. When the user wants to enter the luminance detection mode SCM, the step 5106 may be performed to turn on the luminance detection mode SCM. Then, the step 5108 may be performed on the display device to turn off the first light emitting diode. For example, the first light emitting diode 408, which is not overlapped with the optical sensor 406, may be turned off, or the sub-pixel corresponding to the first light emitting diode 408 may be turned off. For example, when the display device enters the luminance detection mode, the red sub-pixel or the green sub-pixel may be turned off, but not limited thereto. Because the detection of the luminance maybe performed by the second electrical signal generated after the second region R2 of the optical sensor 406 receives the second light L2' of the second light emitting diode 410, in order to decrease the effect of the first light L1' emitted from the first light emitting diode 408 on the result of the detection, the sub-pixel corresponding to the first light emitting diode 408 may be turned off. After the step 5108 is finished, the step 5110 may be performed to receive the second light and generate the second electrical signal. The optical sensor 406 may for example receive the second light L2' emitted from the second light emitting diode 410, and transfer the second light L2' into the second electrical signal in order to confirm the information of the luminance, thereby adjusting the luminance of the second light emitting diode 410, but not limited thereto.

Figure 9:
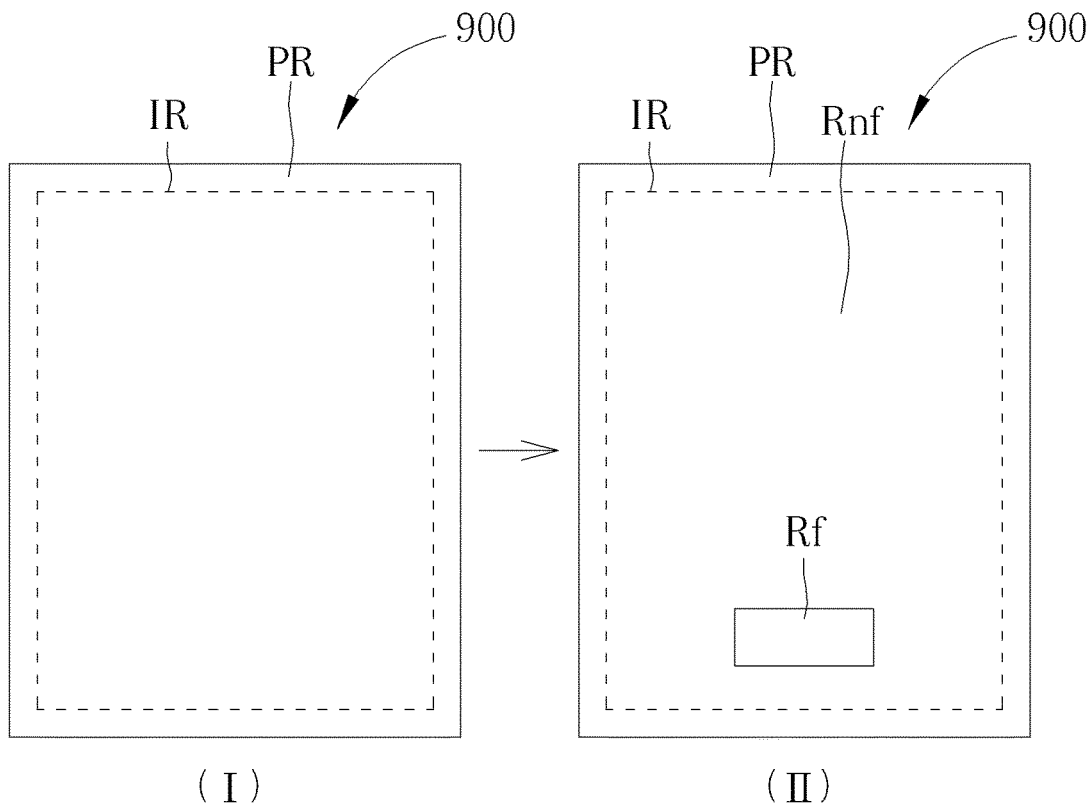
FIG. 9 schematically illustrates an electronic device according to an embodiment of the present disclosure.

Referring to FIG. 9, FIG. 9 schematically illustrates an electronic device according to an embodiment of the present disclosure. As shown in FIG. 9, the electronic device of the present disclosure may be applied to a display device 900, wherein the display device 900 may include a display region IR and a peripheral region PR, and the display device 900 may further include a plurality of optical sensors distributed in the display region IR (not shown in FIG. 9). The optical sensor here may refer to any one of the optical sensors shown in FIG. 1 to FIG. 5, and the display device 900 may include any one of the electronic devices shown in FIG. 1 to FIG. 5 such as the electronic device 400 shown in FIG. 4, wherein the electronic device 400 includes the first light emitting diode 408 and the second light emitting diode 410. In the normal display mode, as shown in part (I), the entire display region IR may display a comprehensive image, but not limited thereto. In the fingerprint detection mode, as shown in part (II), the display region IR of the display device 900 may be divided into the fingerprint detection region Rf and the non-fingerprint detection region Rnf. For example, the fingerprint detection region Rf and the non-fingerprint detection region Rnf may respectively display different colors or patterns. In some embodiments, each of the sub-pixels in the non-fingerprint detection region Rnf may be turned off in the fingerprint detection mode, that is, at least a portion of the light emitting diodes in the non-fingerprint detection region Rnf are turned off, and only the pixels (or the light emitting diodes in these pixels) in the fingerprint detection region Rf are turned on. In some other embodiments, when the display device 900 is in fingerprint detection mode, only at least one of the first light emitting diode, the second light emitting diode and the third light emitting diode (for example, the first light emitting diode) in the fingerprint detection region Rf may be turned on, and at least one of the other light emitting diodes (such as the second light emitting diode and the third light emitting diode) in the fingerprint detection region Rf is turned off, or, the light emitting diode which is overlapped with the optical sensor 406 is turned off, but not limited thereto. The optical sensor in the fingerprint detection region Rf may for example be configured to receive the light reflected by the finger and generate an electrical signal. The electrical signal may for example be served as a fingerprint authentication signal, but not limited thereto. The optical sensor in the non-fingerprint detection region Rnf may for example be configured to receive the ambient light and generate an electrical signal, wherein the electrical signal may for example be served as a background signal, but not limited thereto. It should be noted that when the display device 900 is in the fingerprint detection mode, the optical sensor in the fingerprint detection region Rf may also receive the ambient light other than the light reflected by the finger, so the electrical signal for fingerprint authentication generated by the optical sensor of the fingerprint detection region Rf may include the noise caused by the ambient light. In order to decrease the effect of the ambient light on the signal of fingerprint authentication, the background signal generated by the optical sensor in the non-fingerprint detection region Rnf may be deducted from the electrical signal generated by the optical sensor in the fingerprint detection region Rf to obtain the calibrated fingerprint authentication signal, that is, the calibrated fingerprint authentication signal may be the same as the fingerprint authentication signal deducts the background signal (ambient light), but not limited thereto. Therefore, the effect of the ambient light on the process of fingerprint authentication may be decreased. In another aspect, in some embodiments, when performing calibration of the light emitting diodes on the display device 900, the first light emitting diode in the display region IR may be turned off, only the second light emitting diode is turned on, and the light emitting information of the second light emitting diode may be collected by receiving the light emitted from the second light emitting diode by the optical sensor to perform optical calibration, but the present disclosure is not limited thereto.

As mentioned above, an electronic device is provided by the present disclosure. The electronic device includes a substrate, an optical sensor and a light emitting diode. The optical sensor has a first region not overlapped with the light emitting diode and a second region overlapped with the light emitting diode. The first region of the optical sensor may receive the light emitted from the light emitting diode and reflected by the finger to generate a first electrical signal, and the second region of the optical sensor may receive the light emitted from the light emitting diode to generate a second electrical signal. According to the first electrical signal and the second electrical signal, the electronic device can have functions of luminance calibration and fingerprint authentication. In some embodiments, the optical sensor may receive the ambient light in order to collect the information of the ambient light. Besides, because the optical sensor of the electronic device of the present disclosure may have multiple functions, the size of the electronic device may therefore be decreased.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:
1. An electronic device comprising:
   a substrate;
   a light emitting diode disposed on the substrate and emitting a light; and
   an optical sensor disposed on the substrate and configured to receive the light wherein the optical sensor partially overlaps the light emitting diode in a thickness direction of the substrate, wherein the optical sensor receives the light to generate a first electrical signal for fingerprint authentication, and receives the light to generate a second electrical signal for luminance calibration of the light; and wherein the optical sensor comprises a first region not overlapping the light emitting diode and a second region overlapping the light emitting diode, and an area of the first region is greater than an area of the second region.

2. The electronic device of claim 1, wherein the first region of the optical sensor receives the light to generate the first electrical signal, and the second region of the optical sensor receives the light to generate the second electrical signal.

* * * * *